May 26, 1953  T. P. BUTLER  2,639,906
MINNOW BOX
Filed Jan. 4, 1950  2 Sheets-Sheet 1
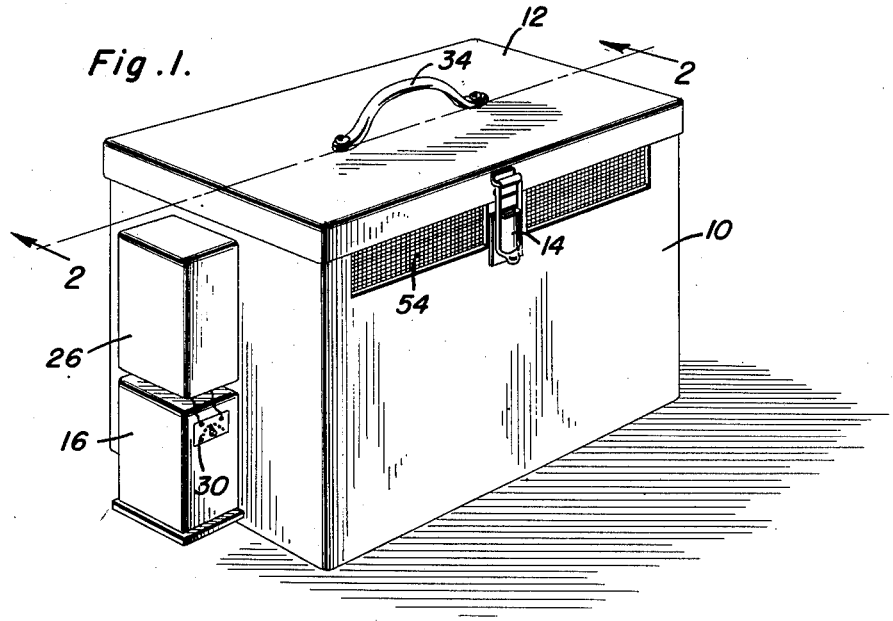
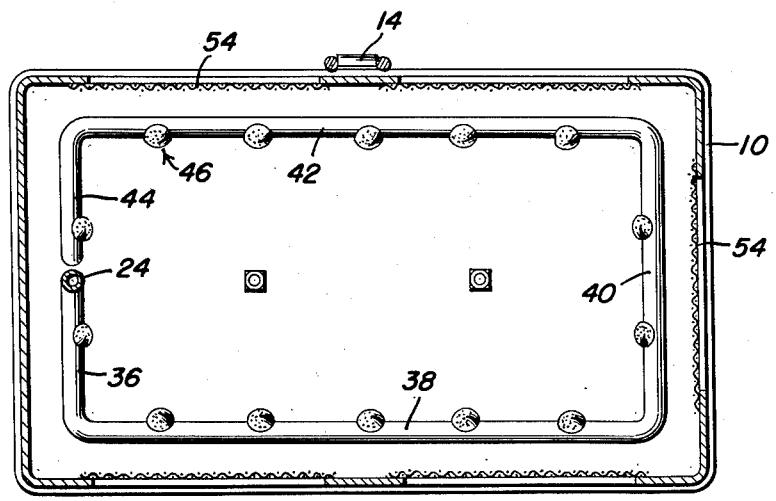
Inventor
Thomas P. Butler
By Clarence A. O'Brien
and Harvey B. Jacobson
Attorneys

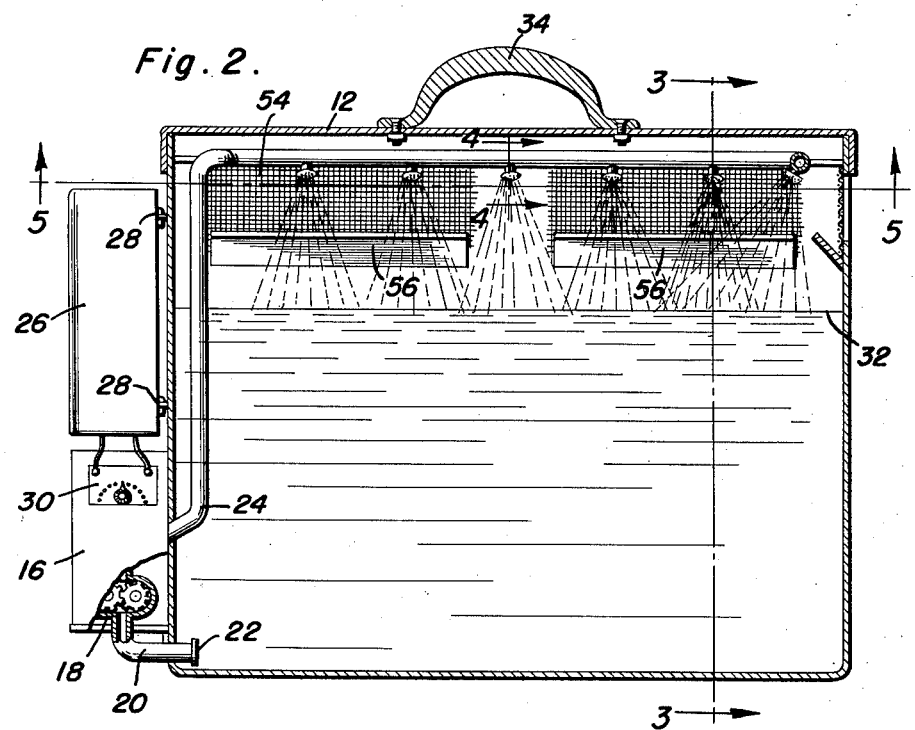
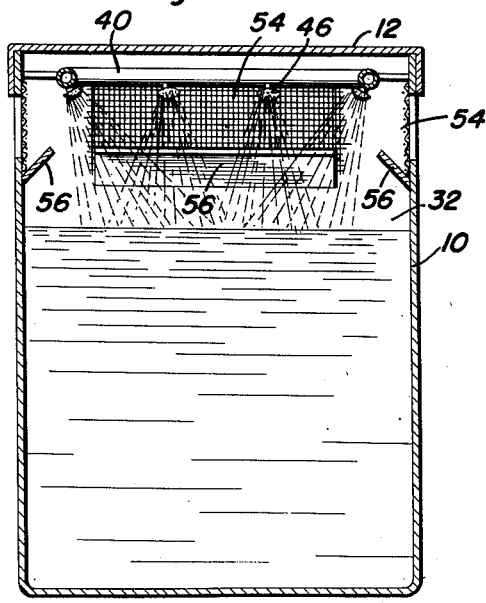
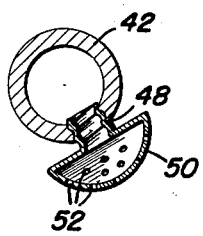

Patented May 26, 1953

2,639,906

UNITED STATES PATENT OFFICE 2,639,906

MINNOW BOX

Thomas P. Butler, Antlers, Okla.

Application January 4, 1950, Serial No. 136,697

1 Claim. (Cl. 261—36)

This invention comprises novel and useful improvements in a minnow box and more specifically pertains to a portable tank for containing live minnows as bait, for maintaining fish in a healthy condition and for aerating the liquid in the tank to maintain the same in sanitary condition for considerable periods of time.

The principal objects of this invention are to provide an improved minnow box which is capable of containing minnow, fish or live bait in a healthy condition for great periods of time; to provide improved means for aerating a minnow storage tank; and to provide a portable, self contained, automatically aerated minnow tank.

These, together with various ancillary features and objects of the invention which will later become apparent as the following description proceeds are attained by the present invention, a preferred embodiment of which has been illustrated by way of example only in the accompanying drawings, wherein:

Figure 1 is a perspective view of a satisfactory embodiment of a minnow box in accordance with the principles of this invention;

Figure 2 is a vertical central longitudinal sectional view taken substantially upon the plane of section line 2—2 of Figure 1, parts being shown in elevation;

Figure 3 is a vertical transverse sectional view taken substantially upon the plane of the section line 3—3 of Figure 2;

Figure 4 is a vertical transverse sectional detail view taken substantially upon the plane of the section line 4—4 of Figure 2; and, Figure 5 is a horizontal sectional view taken substantially upon the plane indicated by the section line 5—5 of Figure 2.

Referring now more specifically to the accompanying drawings, wherein like numerals designate similar parts throughout the various views, the numeral 10 designates a tank of any desired material, character, shape and size, which as illustrated may conveniently comprise a rectangular sheet metal tank provided with a removable cover or closure 12 which may be hinged or otherwise attached to the tank and may be secured thereto as by any conventional form of lock or clasp indicated at 14.

Supported upon the exterior surface of the tank as by welding or otherwise, is a housing 16, which is adapted to receive as shown in Figure 2, a water circulating pump 18 of any desired character provided with an inlet conduit 20 which extends into the tank adjacent its lower portion and terminates in an inlet 22 which may be provided with suitable filter or the like if desired.

Likewise received in the housing 16 is an electric motor of any desired character, not shown, which will be understood is operatively connected with the circulating pump 18 for causing actuation of the same.

Likewise extending through the wall of the tank 10 and connected with the discharge side of the circulating pump 18, is a discharge conduit 24 which extends upwardly into the tank adjacent the side wall thereof for a purpose which will be later set forth.

Detachably secured to the side of the tank, and preferably adjacent the casing 16 containing the electric motor and the circulating pump, is a casing 26 which may be attached or otherwise secured to the wall of the tank as by fastening hooks 28 or the like, this casing receiving any suitable type of storage battery, the same being suitably electrically connected as by means of a rheostat or other control switch 30 with the electric motor operating the same. Preferably, the storage battery contained within the casing 26 is of such character that the same may be connected to a suitable electric circuit for recharging the same and thereby increasing the life of the battery.

It is intended that the tank shall be filled with water to an inside level such as that indicated at 32, whereby minnows, fish or live bait may be retained within the tank and maintained in a live and fresh condition. A suitable handle 34 is secured to the cover 12 whereby the entire device, including the batteries and the electric motor operated pump are rendered portable.

As shown best in Figures 2, 3 and 5, a spray head is mounted in the upper portion within the tank and preferably comprises a pipe or conduit which is coiled about the interior of the tank adjacent the side walls thereof, this spray head being connected with the discharge conduit 24, and having portions 36, 38, 40, 42 and 44, which are each disposed closely adjacent to the upper portion of one of the walls of the tank, the spray head portion 44 being closed at its extremity.

As shown in Figure 4, a plurality of spray nozzles indicated generally by the numeral 46 is provided at suitable intervals along the spray head, each of these spray nozzles comprising an externally threaded neck portion 48 which is received in a threaded bore in the corresponding pipe portion of the spray head, the neck portion 48 having at its outer extremity a semi-spherical or bulbous casing 50 provided with a plurality of discharge orifices 52. Preferably, each of the spray nozzles is secured to the upper portion of the pipe portions, and is directed downwardly and inwardly of the tank with respect to the adjacent tank walls, preferably being at an angle of about 22½° with respect to the plane of the adjacent tank wall. Thus, the spray from the spray head will be directed downwardly and inwardly of the tank and upon the surface of the liquid contained therein.

In order to enhance the aerating effect of this spray suitable screened openings 54 are provided in the upper portions of the tank walls adjacent to and extending considerably below the level of the spray nozzles. Thus, when the spray is discharged through the nozzles by means of the circulating pump, the downwardly directed spray will draw air into the openings 54 and carry the same into the liquid contained within the tank, thereby effectively aerating the same.

In order to prevent splashing of the liquid within the tank out through the screened openings 54, suitable baffles or shields 56 are provided, each preferably comprising a plate which is secured at its lower end to the interior surface of the tank wall immediately below the screened openings 54, and is extended upwardly and inwardly of the tank in a manner as shown in Figures 2 and 3 to prevent splashing of the liquid outwardly through the screened openings 54.

From the foregoing, the operation of the device will now be readily understood. At various speeds determined by the positioning of the rheostat or speed controlling switch 30, the electric motor not shown is energized to operate the fluid circulating pump 18 at various predetermined speeds, thereby causing a circulation of the liquid within the tank into the inlet conduit 20, through the circulating pump, from the discharge conduit 24 through the pipe portions forming the spray head, whereby the various spray nozzles will discharge the same in the form of a spray back upon the surface 32 of the liquid within the tank. This downwardly directed spray as aforementioned will cause the induction of air through the screened openings 54 thereby efficiently aerating the liquid contained within the tank. The screened inlet 22 of the inlet conduit 20 will prevent the introduction of solid matter, dirt or the like into the circulating pump. The baffles 56 will serve to direct the incoming air upwardly into the spray, and also prevent splashing of the liquid from the interior of the tank backwardly and outwardly through the openings 54.

The casing 26 permits the easy removal of batteries from its interior for servicing or for recharging as desired, thereby increasing the usefulness of the entire device.

While the device, as described above, includes a set of batteries as a portable source of power for the electric motor, it is deemed to be preferable to provide any suitable means, as a part of the device, whereby the electric motor may be connected with the electric system of an automotive vehicle, so as to utilize the vehicle electric circuit as a source of power while the device is being transported by the vehicle. This connection and arrangement may be similar to that employed by small, portable radios adapted for selective operation from their self-contained batteries or by an extraneous electrical power circuit.

The invention thus provides a portable minnow box having an improved aerating system therein, improved means for operating the aerating system, and wherein the batteries for powering the electric operation of the liquid circulating pump may be readily serviced, replaced or removed as desired.

From the foregoing, the construction and operation of the invention will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A minnow box comprising a water tank, a circulating pump operatively connected to an electric motor and mounted on the lower outside surface of said tank, said motor being adapted to be operatively connected to a battery, a liquid spray head mounted in the upper portion of said tank, said pump having an inlet conduit extending through the tank wall and communicating with the interior of the tank adjacent its bottom and an outlet conduit extending through the wall of the tank and communicating with said spray head, said spray head including a pipe disposed adjacent the upper, inner surface of said tank wall, a plurality of spray nozzles connected with and mounted on said pipe, each nozzle being positioned to direct its spray downwardly and inwardly of the tank, air inlet openings in the walls of said tank adjacent said spray nozzles, anti-splash baffles secured to the tank walls below said air inlet openings and inclined upwardly in said tank.

THOMAS P. BUTLER.

References Cited in the file of this patent

UNITED STATES PATENTS

| Number | Name | Date |
|---|---|---|
| 1,604,971 | Churchill et al. | Nov. 2, 1926 |
| 1,868,632 | Edge | July 26, 1932 |
| 2,088,962 | Kleucker | Aug. 3, 1937 |
| 2,194,037 | Thuma | Mar. 19, 1940 |
| 2,253,516 | Haldeman | Aug. 26, 1941 |
| 2,261,830 | Ditner | Nov. 4, 1941 |
| 2,466,570 | Blicker et al. | Apr. 5, 1949 |
| 2,471,573 | Lumpkin | May 31, 1949 |
| 2,587,834 | Goode | Mar. 4, 1952 |